UNITED STATES PATENT OFFICE.

McKENZIE ARNN, OF BRISTOL, VIRGINIA.

MINERAL COMPOUND.

SPECIFICATION forming part of Letters Patent No. 703,516, dated July 1, 1902.

Application filed October 7, 1901. Serial No. 77,911. (No specimens.)

*To all whom it may concern:*

Be it known that I, McKENZIE ARNN, a citizen of the United States, residing at Bristol, in the county of Washington and State of Virginia, have invented certain new and useful Improvements in Mineral Compounds; and I do hereby declare the following to be a full, clear, and exact description of the invention, such as will enable others skilled in the art to which it appertains to make and use the same.

The object of my invention is to produce from what is commonly regarded as a worthless by-product of an iron-furnace or the like a substance which by proper treatment will be found to possess immense value and utility, as will be hereinafter more particularly pointed out.

A further object of my invention is to provide simple, cheap, and reliably efficient means whereby various pleasing characteristics will be imparted to the substance which I thus produce from slag.

Other objects and advantages will be made clearly apparent from the following specification.

In view of the fact that my invention comprehends a certain specified process of manipulation I deem it unnecessary for the purposes of this application to prepare drawings in illustration of the mechanical means adopted to secure a commingling or intimate association of the various elements employed by me in the practical demonstration of my invention, and I will therefore proceed at once with the description of the preferred formulas and manner of using the ingredients thus individually specified. As is well known, the product of an iron-furnace or the like, termed "slag" in common parlance, which term, however, is broadly used to designate the residuum of ores treated by intense heat, is in itself a crude substance, which heretofore has often been regarded as a useless incumbrance of the furnace where it is produced.

Specifically referring to the special process of treatment which I have adopted for crude slag or the by-product of an iron-furnace or the like, I will base my description upon the assumption that one hundred tons of the crude slag is to be treated, and I shall therefore prepare the formula showing proper proportion of the several ingredients to be used, with the understanding that such proportion is relative to one hundred tons of the crude slag, as follows:

For the treatment of one hundred tons of crude slag I use six hundred pounds chlorid sodium, (salt,) two hundred and fifty pounds lime, five gallons sulfuric acid, twelve pounds hydrochloric acid, ten gallons coal-tar, ten pounds pulverized mica, ten pounds talc, ten pounds kaolin clay. To the foregoing ingredients sufficient soft water is added necessary to produce a free or loose plastic condition of the mass. This plastic mass of matter is then introduced into a vat formed of suitable material in order that it may withstand the intense heat of the molten slag, which latter is introduced through a suitable opening in the bottom of the tank after the composition introduced therein. The result will be that the molten mass of slag, amounting to one hundred tons, as above specified, will become thoroughly incorporated with the plastic mass. After the ingredients have thus been thoroughly commingled with each other and allowed to stand and still kept at the same degree of temperature a precipitation of the heavier particles of the mass will take place. After the contents of the tank have become cooled the same are turned out upon the ground and the lower portion of the mass separated from the upper part thereof. Both parts are then separately pulverized, and the lower portion of the substance may be treated by any of the well-known processes for the separation of any remaining metallic substances therein contained. The upper portion of the mass after being finely pulverized may be used as follows: To one hundred pounds thereof I add five pounds of coal-tar, one pound of sulfuric acid, and five ounces of hydrochloric acid, and the resultant product will be found a very desirable and valuable commercial article, inasmuch as it may be incorporated in any of the well-known ways with ordinary cement in a proportion of twenty per cent. of my composition to eighty per cent. of ordinary cement. After the upper portion of the mass has been pulverized, as above set forth, and incorporated with the coal-tar, sulfuric acid, and hydrochloric acid and thus thoroughly commingled with the cement the matter may be incorporated with a sufficient quantity of water to form a plastic substance, which may be directly applied to the laths or brickwork, thereby forming a valuable and durable plastering, or such substance may be molded or otherwise shaped into bricks, paving-stones, or may be formed into sheets which will take the place of shingles or slates, and will thus constitute a most valuable and permanent form of roofing. The plastic material may also be applied directly as roofing, inasmuch as the sheeting ordinarily used in roofing may be replaced by laths in order that the plastic substance may be spread thereon the same as the plasterer will use it upon the walls of a building. It is found by experiment and practice that when the plastic material has thus been spread or distributed as plaster it will dry free from cracks or crazing, and the result will be that the roof will comprise one continuous sheet of extremely durable material.

It will be difficult to enumerate the many and varied uses to which my invention may be applied, though it may be stated that in addition to the enumerated uses above set forth it will also be desirable for building partition-walls direct from the plastic material after it has been added to a proper proportion of common cement. The walls thus formed will be sound and waterproof as well as being indestructible by fire. The plastic material may be molded into doorsteps, stairways, ornamental railings, cornices, &c., as will be obvious. Water-holding receptacles, as stationary washtubs, sinks, or the like, may also be readily and cheaply formed therefrom, and deeming it unnecessary to more fully particularize the various uses of my invention I will dispense with further reference to the details.

Having thus fully described my invention, what I claim as new, and desire to secure by Letters Patent, is—

The herein-described method of treating slag from furnaces, consisting of the addition to molten slag, of salt, lime, sulfuric acid, hydrochloric acid, coal-tar, pulverized mica, talc, kaolin, clay and water, the said ingredients being combined with slag substantially in the proportions and in the manner set forth, the separating out of the lighter portion of the mass and the subsequent pulverizing of the compound thus formed after the same has become cold and the mixing with each one hundred pounds of the pulverized mass thus produced, of five pounds of coal-tar, one pound of sulfuric acid and five ounces of hydrochloric acid and the mixing of the same with ordinary cement in the proportion of twenty per cent. of said product with eighty per cent. of ordinary cement as and for the purpose set forth.

In testimony whereof I affix my signature in presence of two witnesses.

McKENZIE ARNN.

Witnesses:
W. T. Fitz Gerald,
Wm. A. Easterday.